(12) United States Patent
Ramappan et al.

(10) Patent No.: US 7,415,348 B1
(45) Date of Patent: Aug. 19, 2008

(54) MULTIPLE INJECTION BLEND FOR DIRECT INJECTED ENGINES

(75) Inventors: Vijay Ramappan, Novi, MI (US); Jesse M. Gwidt, Brighton, MI (US); Jonathan T. Shibata, Milan, MI (US); Stuart R. Smith, Howell, MI (US); Michael J. Lucido, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 10 days.

(21) Appl. No.: 11/676,561

(22) Filed: Feb. 20, 2007

(51) Int. Cl.
*F02B 3/10* (2006.01)
*G06F 19/00* (2006.01)

(52) U.S. Cl. .................. 701/111; 701/105; 123/299; 123/480

(58) Field of Classification Search ......... 701/103–105, 701/111, 110; 123/295, 299, 480
See application file for complete search history.

(56) References Cited

U.S. PATENT DOCUMENTS

| 5,233,964 | A * | 8/1993 | Jamoua et al. | 701/103 |
| 6,880,531 | B2 * | 4/2005 | Bayerle et al. | 123/480 |
| 7,245,038 | B2 * | 7/2007 | Albertson et al. | 290/44 |
| 7,322,339 | B1 * | 1/2008 | Gwidt et al. | 123/299 |

\* cited by examiner

*Primary Examiner*—Hieu T Vo

(57) ABSTRACT

A fuel injection system for a direct fuel injection engine includes an injection mode module. The injection mode module selects a fuel injection mode to be one of a single injection mode and a dual injection mode. A fuel injection command module transitions between the single and dual injection modes by varying the timing of fuel injection events relative to a crankshaft position.

22 Claims, 4 Drawing Sheets

MULTIPLE INJECTION BLEND FOR DIRECT INJECTED ENGINES

FIELD

The present disclosure relates to methods and systems for direct fuel injection engines.

BACKGROUND

The statements in this section merely provide background information related to the present disclosure and may not constitute prior art.

Controlling the amount of fuel and air to be delivered per cylinder for a four stroke internal combustion engine is important to achieve optimum performance. Proper timing of intake and exhaust valves also provide for better performance. Conventional engines include camshafts that regulate the timing of the valves. The rotation of the camshaft can be controlled to ensure proper timing of each valve. In addition cam phasers may be included to alter the position of the camshafts relative to the crankshaft, which provides for further opportunities to properly adjust the timing of each valve.

The placement of fuel injectors within the engine and the control of fuel injection timing also impacts engine performance. Spark-ignited direct injected (SIDI) engines locate one fuel injector per cylinder, mounted directly over the cylinder head. Each injector is controlled individually to inject fuel directly into the cylinder.

Conventional methods of controlling fuel during idle conditions in a SIDI engine include intentionally retarding the spark timing in order to provide a reserve torque. Spark timing is then advanced when a request for torque is initiated. This allows the engine to respond to load demands during idle operation. Retarding spark at idle provides for sub-optimal efficiency.

Other methods of fuel injection control include delivering multiple fuel injection events per cylinder per combustion cycle. A direct injection engine may use two injection events per cylinder per combustion cycle in special operation regimes to provide additional energy for converter lightoff, a smooth idle, and reduce engine knock. Unfortunately, the dual injection mode of operation produces higher hydrocarbon emissions and particulates. Accordingly, engine control may primarily include providing one injection event per cylinder per combustion cycle for emissions reasons. The dual injection method may be sparingly used for special operation regimes.

Dual injection per cylinder per combustion cycle generates more or less engine torque than a single injection mode within the same engine at similar operating conditions. Accordingly, drivability may be affected by sudden engine output torque changes during periods when the fuel delivery mode changes from a single to a multiple injection mode and vice versa.

SUMMARY

Accordingly, a fuel injection system for a direct fuel injection engine is provided. The system includes an injection mode module to select a fuel injection mode to be one of a single injection mode and a dual injection mode and a fuel injection command module that transitions between the single and dual injection modes by varying the timing of fuel injection events relative to a crankshaft position.

In addition, a fuel injection method of a direct fuel injection engine is provided. The method includes operating the engine in a single injection mode, commanding fuel delivery at a first crankshaft position, receiving a request to transition from a single injection mode to a dual injection mode and transitioning to the dual injection mode by commanding fuel delivery at a second crankshaft position and at a third crankshaft position wherein the third crankshaft position is changed incrementally during subsequent combustion cycles until a target third crankshaft position is reached.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
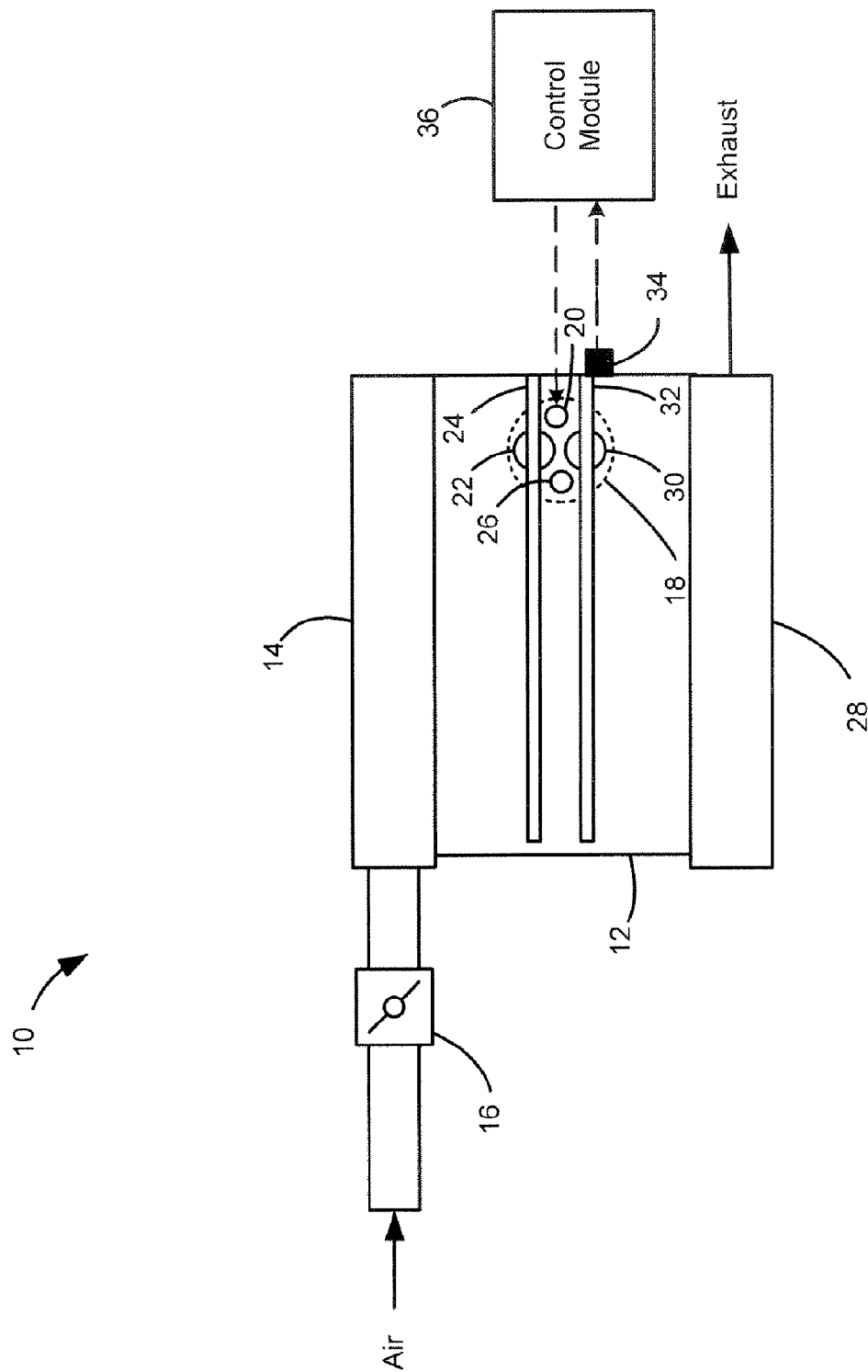
FIG. 1 is a functional block diagram illustrating an internal combustion engine system including direct fuel injection hardware.

The following description is merely exemplary in nature and is in no way intended to limit the disclosure, its application, or uses. For purposes of clarity, the same reference numbers will be used in the drawings to identify the same elements. As used herein, the term module and/or device refers to an application specific integrated circuit (ASIC), an electronic circuit, a processor (shared, dedicated, or group) and memory that execute one or more software or firmware programs, a combinational logic circuit and/or other suitable components that provide the described functionality.

Referring now to FIG. 1, an engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although a single cylinder 18 is illustrated, it can be appreciated that the engine can have a plurality of cylinders including, but not limited to 2, 3, 4, 5, 6, 8, 10, 12 and 16 cylinders.

A fuel injector 20 is electronically controlled to inject fuel into the cylinder 18. Fuel is combined with air as it is drawn into the cylinder 18 through the intake port. An intake valve 22 selectively opens and closes to enable the air to enter the cylinder 18. The intake valve position is regulated by an intake camshaft 24. A piston (not shown) compresses the air/fuel mixture within the cylinder 18. A spark plug 26 initiates combustion of the air/fuel mixture, driving the piston in the cylinder 18. The piston drives a crankshaft (not shown) to produce drive torque. Combustion exhaust within the cylinder 18 is forced out through an exhaust manifold 28 when an exhaust valve 30 is in an open position. The exhaust valve position is regulated by an exhaust camshaft 32. The exhaust can then be treated in an exhaust system (not shown). Although single intake and exhaust valves 22,30 are illustrated, it can be appreciated that the engine 12 can include multiple intake and exhaust valves 22,30 per cylinder 18.

A crankshaft sensor 34 senses a position of the crankshaft and generates a crankshaft signal. A control module 36 receives the crankshaft signal, interprets the signal as degrees of rotation and schedules fuel injection events based on the interpretation of the signal. The control module 36 sends a fuel injection signal to the fuel injector to control the amount and the timing of the fuel delivery. The fuel injection signal can be a pulse width modulated signal where the pulse width regulates the amount of fuel delivered to the cylinder.

Figure 2:
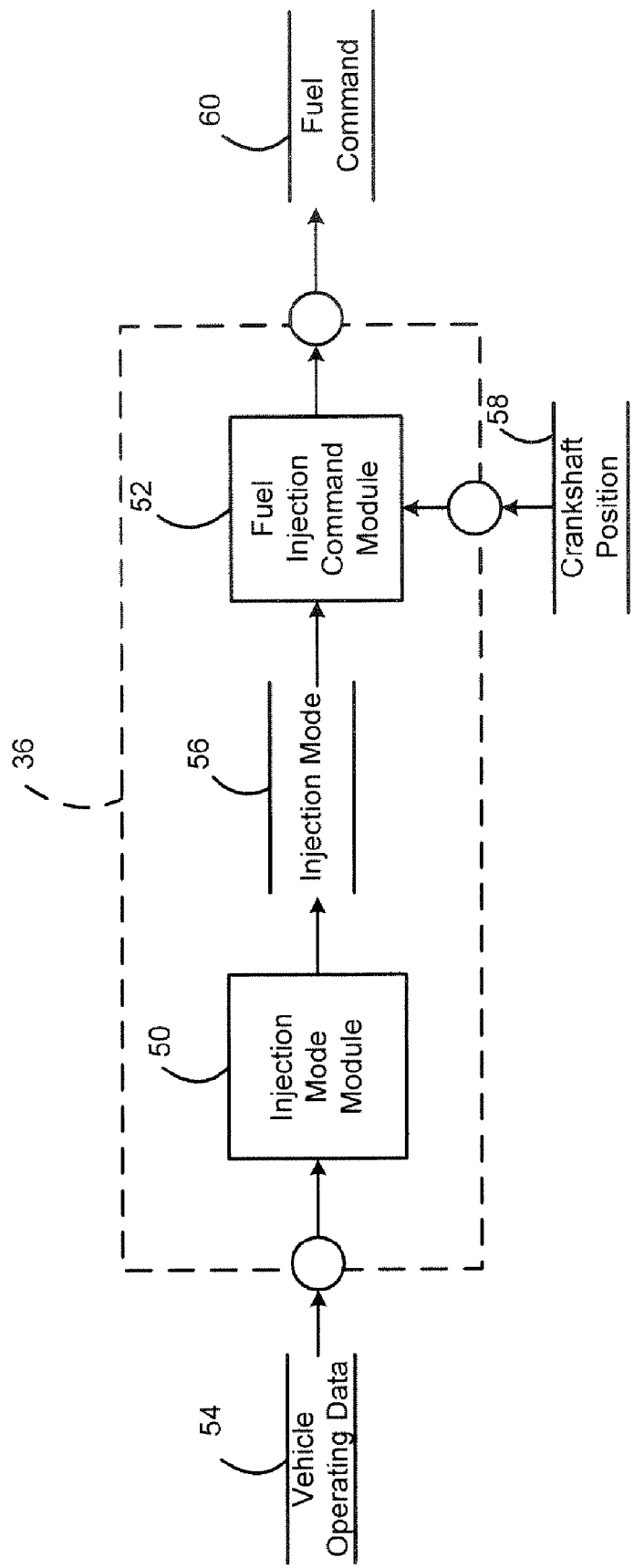
FIG. 2 is a dataflow diagram illustrating a fuel injection system.

Referring now to FIG. 2, the present disclosure provides a control method and system that governs the transitions between single and dual fuel injection modes. A dataflow diagram illustrates a fuel injection system that may be embedded within the control module 36. Various embodiments of fuel injection systems according to the present disclosure may include any number of sub-modules embedded within the control module 36. The sub-modules shown may be combined and/or further partitioned to similarly govern the transitions between the single injection mode and the dual injection mode during engine operation.

Figure 3:
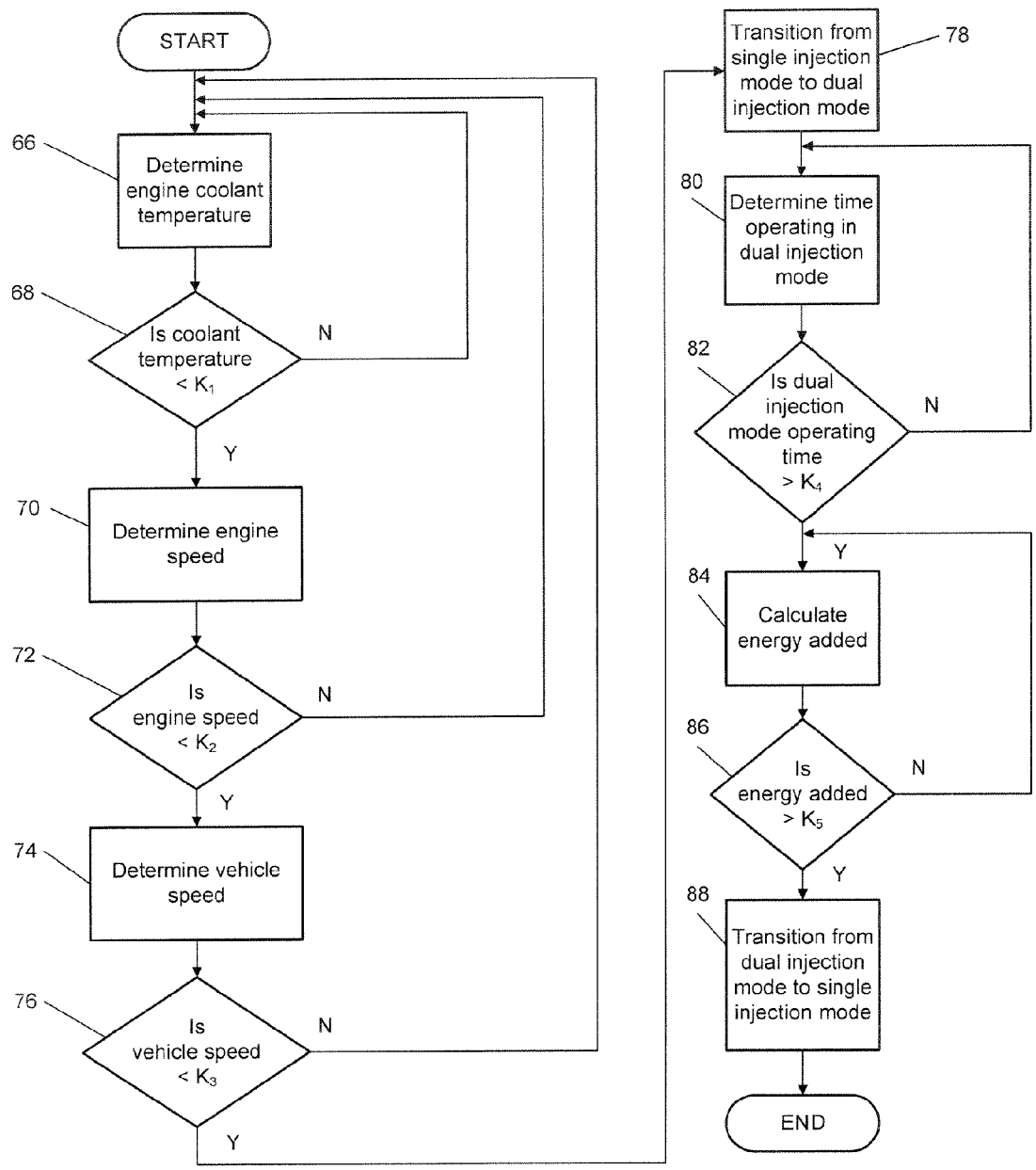
FIG. 3 is a flow chart illustrating a method of transitioning between single injection and dual injection modes.

In various embodiments, the control module 36 of FIG. 2 includes an injection mode module 50 and a fuel injection command module 52. The injection mode module 50 receives engine and vehicle operating data 54 as an input. As can be appreciated, the inputs to the injection mode module 50 may be sensed from the system 10, received from other control modules (not shown) in the system, or determined from other sub-modules within the control module 36. FIG. 3 provides a flow chart with an exemplary method of transitioning between single injection and dual injection modes where vehicle operating data 54 includes coolant temperature, engine speed and vehicle speed. This exemplary method will be described in greater detail hereinafter.

Based on the operating data 54, the injection mode module 50 selects an injection mode 56 to be one of a single injection mode and a dual injection mode. The fuel injection command module 52 receives the injection mode 56 and a crankshaft position 58 as inputs. The fuel injection command module 52 schedules fuel injection events and provides a fuel command 60 based on the injection mode 56 and the crankshaft position 58.

During the dual injection mode, two injection events are scheduled per cylinder per combustion cycle. This generates a change in torque without increasing fuel consumption. Fuel injection command module 52 smoothly transitions engine operation between single and dual injection modes of operation. Torque variations or "bumps" during operating mode transitions are minimized.

Referring to FIG. 3, the flow chart illustrates an exemplary method of transitioning between single injection and dual injection modes. In this example, it may be beneficial to switch from a single injection mode to a dual injection mode to perform catalytic converter light off. Catalytic converter light off may be implemented soon after engine start-up to quickly heat up the catalyst within the catalytic converter to reduce engine emissions. Catalytic converter light off is an example sub-mode of dual injection operation that may be determined by injection mode module 50. Once this sub-mode of operation is entered, control block 66 determines the temperature of the engine coolant. Decision block 68 determines if the coolant temperature is less than a predetermined constant $K_1$. $K_1$ may be chosen to represent a temperature indicative of an engine operating at start up or having run for a minimal amount of time. If the coolant temperature is greater than or equal to $K_1$, control returns to control block 66. If the coolant temperature is less than $K_1$, control block 70 determines the engine operating speed.

Control block 72 determines if the engine speed is less than a predetermined constant $K_2$. If the engine is operating at a relatively low speed near idle, catalytic converter light off may be desirable. If the engine is operating at a higher speed, sufficient energy and additional fuel may already be supplied to the catalytic converter such that additional fuel need not be provided. Accordingly, if the engine speed is greater than or equal to $K_2$, control returns to control block 66. If the engine speed is less than $K_2$, control block 74 determines the vehicle speed.

If the vehicle is in motion above a predetermined speed, catalytic converter light off may not be desirable because immediate engine response to a torque request may be desired. As such, decision block 76 determines if the vehicle speed is less than the predetermined constant $K_3$. If the vehicle speed is greater than or equal to $K_3$, control is returned to control block 66. If the vehicle speed is less than $K_3$, control block 78 transitions engine fuel injection from the single injection mode to the dual injection mode. The specific steps taken during the transition will be described in greater detail hereinafter.

Once a transition from the single injection mode to the dual injection mode has been completed, control block 80 determines the amount of time that the engine has been operating in the dual injection mode. Decision block 82 determines if the dual injection mode operating time is greater than a predetermined constant $K_4$. If the engine has not been operating within the dual injection mode greater than $K_4$, control returns to control block 80. If the dual injection mode operating time exceeds $K_4$, control block 84 calculates an amount of energy added to the catalytic converter by operation in the dual injection mode.

Decision block 86 determines if the energy added exceeds a predetermined threshold of $K_5$. If the energy threshold has not been reached, control returns to control block 84. If the energy threshold, $K_5$, has been exceeded, catalytic converter light off has been completed and control block 88 transitions from the dual injection mode to the single injection mode.

Figure 4:
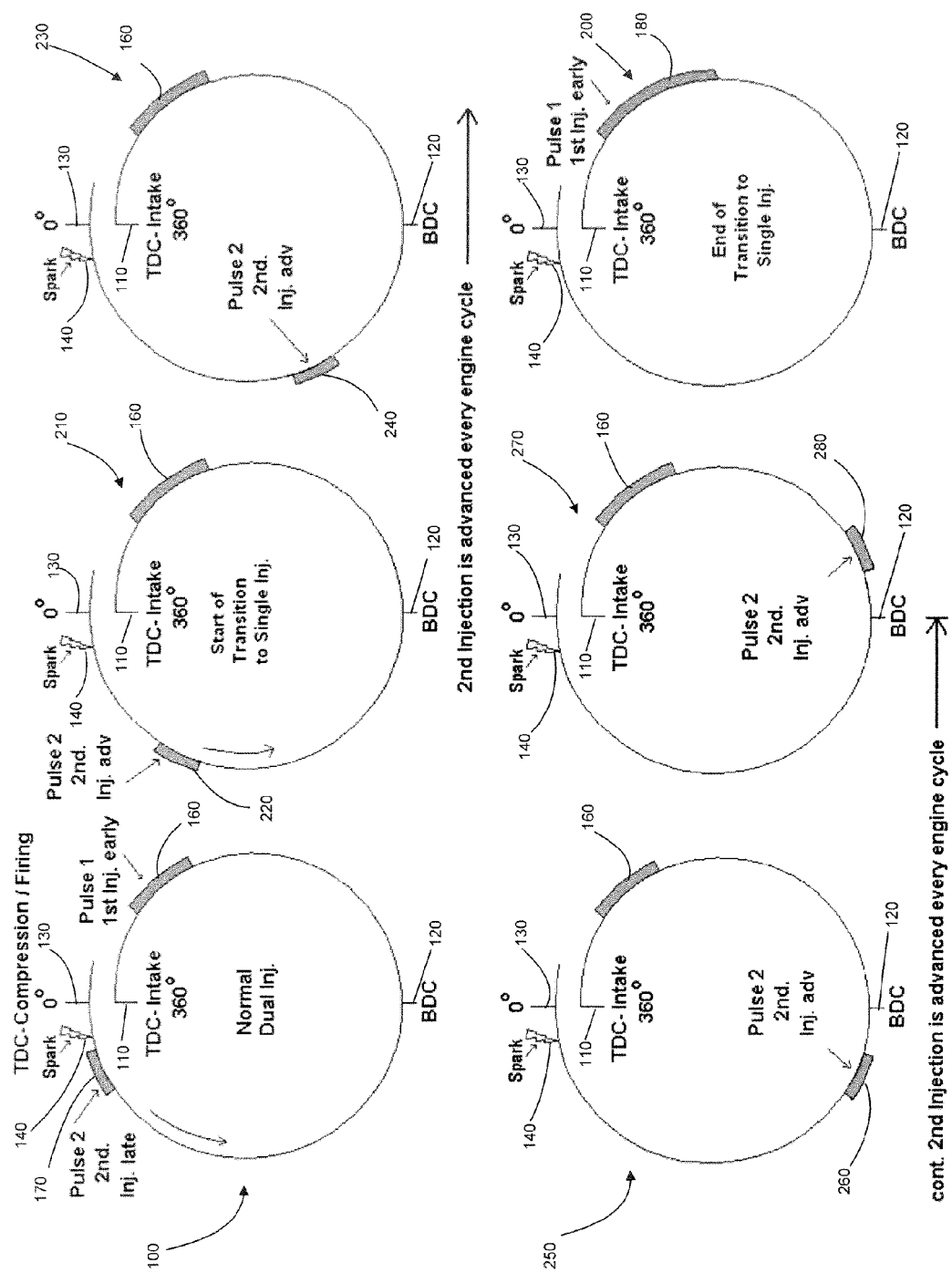
FIG. 4 includes timing diagrams illustrating the scheduling of fuel injection events during a single injection mode, a dual injection mode and transition therebetween.

Referring now to FIG. 4, timing diagrams for scheduling fuel injection events according to the present disclosure are shown. In the example depicted, control begins in the dual injection mode shown generally at 100. During the dual injection mode, two injection events are scheduled per cylinder per combustion cycle. If injection mode module 50 determines that appropriate conditions exist, control switches to a single injection mode shown generally at 200.

Injection mode module 50 may determine through evaluation of operating data 54 that a dual injection mode should be entered. Examples relating to special operation regimes where mode switching would be beneficial include dual injection sub-modes such as the catalytic converter light off sub-mode previously described as well as idle fuel efficiency increase sub-mode, an idle stability sub-mode and an engine knock reduction sub-mode. While these sub-modes will not be described in great detail, it should be noted that entry and exit from these sub-modes of operation of double injection may cause torque variations as previously described. As such, the present disclosure provides an apparatus and a method of minimizing torque variations during transition between dual injection and single injection modes.

Fuel injection events can be scheduled according to the crankshaft position indicated by degrees of crank rotation. A crankshaft signal can be interpreted as a position in crank degrees. Each diagram illustrates the position of the crankshaft in crank degrees during intake and compression cycles. The piston begins an intake stroke at three hundred sixty (360) crank rotation degrees before top dead center at 110.

The piston begins a compression stroke at one hundred eighty (180) crank rotation degrees before top dead center (also referred to bottom dead center (BDC)) at 120. The piston ends the compression stroke at top dead center or zero (0) crank rotation degrees shown at 130. Firing of spark for both the single injection mode 200 and the dual injection mode 100 typically occurs near top dead center of the compression stroke at 140. In the example depicted in FIG. 4, firing occurs between ten (10) and zero (0) crank degrees before top dead center. However, as will be described, spark timing may also be varied to provide a smooth transition between single and dual injection modes.

As mentioned, the dual injection mode 100 provides two fuel injection events per cylinder per intake and compression cycle. The first injection event is scheduled early in the intake cycle and can be scheduled anywhere between two hundred fifty (250) and three hundred eighty (380) crank degrees before top dead center. An exemplary range for scheduling the first fuel delivery is between two hundred and seventy (270) and three hundred and thirty (330) crank degrees before top dead center as shown at 160.

The second fuel injection event is scheduled in one of the intake and compression cycles and can be scheduled anywhere between zero (0) and three hundred sixty (360) crank degrees before top dead center. An exemplary range for scheduling the second fuel delivery is between one hundred twenty (120) and two hundred seventy (270) crank degrees before top dead center as shown at 170. The second injection event injects the remainder of fuel necessary for the combustion cycle.

If an injection mode change is requested, the injection mode is transitioned over time to the single injection mode 200 where a single injection event is scheduled early in the intake cycle. The injection event is scheduled early and can be scheduled anywhere between two hundred fifty (250) and three hundred eighty (380) crank degrees before top dead center. An exemplary range for scheduling the fuel delivery is between two hundred and seventy (270) and three hundred and thirty (330) crank degrees before top dead center as shown at 180. The single injection mode 200 delivers more or less torque than dual injection for the same conditions but allows for spark timing to be near minimum best torque (MBT) or knock border limit (KBL) to improve efficiency.

FIG. 4 includes additional timing diagrams depicting injection pulse timing during the transition between dual injection mode 100 and single injection mode 200. In particular, timing diagram 210 shows the start of transition from dual injection mode 100 to single injection mode 200. Within the first step of the transition at timing diagram 210, the first fuel delivery 160 is performed at the same or similar time as previously described in reference to dual injection mode 100 while a second fuel injection event is scheduled ten degrees advanced from the prior second injection as shown at 220. Timing diagram 230 represents the next intake and compression strokes for a given cylinder where the first injection event schedule remains constant while the second injection event has been advanced another ten crank degrees as shown at 240. Timing diagrams 250 and 270 depict second injection events 260 and 280, respectively. Second injection event 260 occurs at ten crank degrees advanced relative to second injection event 240. Second injection event 280 occurs ten degrees advanced relative to second injection event 260. After timing diagram 270 has been implemented, control switches to single injection mode 200. To transition from single injection mode 200 to dual injection mode 100, the previously described method is reversed.

As mentioned earlier, spark delivery timing may also be varied during injection mode switching. Spark timing modification is based on the sub-mode of dual injection. In the idle fuel efficiency increase sub-mode, spark timing is typically near MBT in the dual injection mode. During transition from the dual injection to the single injection mode, spark timing is retarded by about five to ten degrees so that torque fluctuations are minimized. Spark advance is lag filtered toward MBT during transitions from the single injection to the dual injection mode.

Idle stability and catalytic converter light off sub-modes typically include retarding spark timing to after top dead center during the dual injection mode. When transitioning from the dual injection mode to the single injection mode, spark timing is advanced toward the single injection target spark timing at a rate of about two degrees per cylinder combustion event. This process is reversed during transition from the single injection to the dual injection mode.

The engine knock reduction sub-mode is entered to ensure absence of engine knock. The dual injection mode is entered to achieve this goal. During transition from the single injection to the dual injection mode, spark timing is lag filtered toward a dual injection spark timing target. The target spark timing is less retarded than possible to assure engine knock reduction.

It should be appreciated that transition between the single injection mode and the dual injection mode may be accomplished solely via adjustment of the second injection event timing as depicted in FIG. 4 or may also include in combination modifying the spark timing during the transition. In addition, those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A fuel injection system for a direct fuel injection engine, comprising:
   an injection mode module that selects a fuel injection mode to be one of a single injection mode and a dual injection mode during engine operation; and
   a fuel injection command module that receives crankshaft position and that transitions between the single and dual injection modes by varying timing of fuel injection events during said transition based on said crankshaft position.

2. The system of claim 1 wherein the fuel injection command module commands a first fuel injection event when the crankshaft position is within a first predetermined angle range and a second fuel injection event when the crankshaft is within a second predetermined angle range during the dual injection mode and wherein the fuel injection mode module commands the second fuel injection event to occur at incrementally advanced crankshaft positions during said transition between the single and dual injection modes.

3. The system of claim 2 wherein the timing of the first fuel injection event remains constant during the transition between the single and dual injection modes.

4. The system of claim 3 wherein the timing of the second fuel injection event is advanced approximately ten degrees every subsequent combustion event.

5. The system of claim 1 further including varying spark timing during transitions between the single and dual injection modes.

6. The system of claim 5 wherein the spark timing is varied when transitioning from one of an idle fuel efficiency increase mode, an idle stability mode, a catalytic converter light off mode and an engine knock reduction mode.

7. The system of claim 6 wherein the catalytic converter light off mode includes retarding spark timing to after top dead center in the dual injection mode and advancing spark timing at a rate of substantially two degrees per cylinder per combustion event until a target single injection mode spark timing is met.

8. The system of claim 6 wherein the engine knock reduction mode includes transitioning into the dual injection mode.

9. The system of claim 8 wherein varying the spark timing during a transition from the single injection mode to the dual injection mode includes retarding the spark timing.

10. A fuel injection method for a direct fuel injection engine, comprising:
    operating the engine in a single injection mode;
    commanding fuel delivery at a first crankshaft position;
    receiving a request to transition from a single injection mode to a dual injection mode; and
    transitioning to the dual injection mode by commanding fuel delivery at a second crankshaft position and at a third crankshaft position wherein the third crankshaft position is changed incrementally during subsequent combustion cycles until a target third crankshaft position is reached.

11. The method of claim 10 wherein the commanding fuel delivery at a first crankshaft position further includes commanding fuel delivery when the crankshaft position is within a first predetermined range during an intake cycle of an engine cylinder.

12. The method of claim 11 wherein the commanding fuel delivery at a second crankshaft position and at a third crankshaft position further includes commanding fuel delivery at the second crankshaft position when the crankshaft position is within a second predetermined range and commanding fuel delivery at the third crankshaft position when the crankshaft position is within a third predetermined range during intake and compression cycles of the engine cylinder.

13. The method of claim 12 wherein the second predetermined range is substantially the first predetermined range.

14. The method of claim 10 wherein the third crankshaft position is retarded at a rate of ten degrees per cylinder combustion event until the target third crankshaft position is reached.

15. The method of claim 14 wherein the third crankshaft position is varied between 120 and 270 degrees of crankshaft rotation before top dead center.

16. The method of claim 10 further including receiving a request to transition from the dual injection mode to a single injection mode and transitioning to the single injection mode by commanding fuel delivery at the third crankshaft position to be advanced at a predetermined rate during subsequent combustion cycles.

17. The method of claim 10 wherein transitioning to the dual injection mode includes commanding spark delivery at a first spark timing position and varying spark timing per subsequent combustion cycles until spark is delivered at a second spark timing position.

18. The method of claim 17 further including anticipating a sub-mode of dual injection operation to be entered and setting the first spark timing position based on the anticipated sub-mode.

19. The method of claim 18 wherein the sub-modes include idle fuel efficiency increase, idle stability, catalytic converter light off and engine knock reduction.

20. The method of claim 19 wherein the first spark timing position is set to a value ranging from five to ten degrees retarded from a maximum brake torque value and wherein the second spark timing position is near the maximum brake torque value when transitioning to the idle fuel efficiency increase sub-mode.

21. The method of claim 19 wherein transitioning to one of the idle stability and the catalytic converter light off sub-modes includes setting the second spark timing position to occur after top dead center.

22. The method of claim 19 wherein transition to the engine knock reduction sub-mode includes setting the second spark timing position at a value retarded relative to the first spark timing position.

* * * * *